United States Patent [19]
Bredemeyer

[11] Patent Number: 5,607,165
[45] Date of Patent: Mar. 4, 1997

[54] SEALING SYSTEM FOR A VALVE HAVING BIASSED SEALANT UNDER PRESSURE

[75] Inventor: Lindsey D. Bredemeyer, Missouri City, Tex.

[73] Assignee: Cooper Cameron Corporation, Houston, Tex.

[21] Appl. No.: 486,358

[22] Filed: Jun. 7, 1995

[51] Int. Cl.$^6$ .................................................. F16J 15/20
[52] U.S. Cl. ......................... 277/2; 277/59; 277/72 FM; 277/188 A
[58] Field of Search ............................... 277/2, 4, 59, 64, 277/69, 71, 72 R, 72 FM, 79, 106, 135, 188 A

[56] References Cited

U.S. PATENT DOCUMENTS

| | | |
|---|---|---|
| 2,731,282 | 1/1956 | McManus et al. ................. 277/72 FM |
| 2,939,697 | 6/1960 | Hogan ........................................ 277/2 |
| 3,086,745 | 4/1963 | Natho ................................. 277/72 FM |
| 3,129,009 | 4/1964 | Simpson ..................................... 277/2 |
| 3,199,876 | 8/1965 | Magos et al. ...................... 277/72 FM |
| 3,375,013 | 3/1968 | Grantom .................................... 277/2 |
| 3,398,964 | 8/1968 | Trefil ................................. 277/72 FM |
| 3,641,542 | 2/1972 | Grove et al. . |
| 3,955,822 | 5/1976 | Irby . |
| 4,197,531 | 4/1980 | Wentworth, Jr. . |
| 4,295,653 | 10/1981 | Coles . |
| 4,364,542 | 12/1982 | Meyer ................................. 277/72 FM |
| 4,647,050 | 3/1987 | Johnson . |
| 4,972,867 | 11/1990 | Ruesch . |
| 5,056,758 | 10/1991 | Bramblet ............................ 277/72 FM |
| 5,129,624 | 7/1992 | Icenhower et al. . |
| 5,129,625 | 7/1992 | Wood et al. . |
| 5,170,659 | 12/1992 | Kemp . |
| 5,178,363 | 1/1993 | Icenhower et al. . |
| 5,203,370 | 4/1993 | Block et al. . |
| 5,244,183 | 9/1993 | Calvin et al.. ...................... 277/72 FM |

FOREIGN PATENT DOCUMENTS

| | | | |
|---|---|---|---|
| 1283473 | 1/1987 | U.S.S.R. ................................ 277/2 |
| 94/28336 | 12/1994 | WIPO ..................................... 277/2 |

*Primary Examiner*—Scott Cummings
*Attorney, Agent, or Firm*—Conley, Rose & Tayon P.C.

[57] ABSTRACT

The sealing system seals a moving element in a valve. The sealing system includes an internal seal between the valve body and moving element proximate the lading and an external seal between the valve body and moving element proximate the free end of the moving element. A space for sealant is formed around the moving element between the internal and external seals. A load member is provided for pressurizing the sealant within the space to a pressure greater than the fluid pressure of the lading in the valve body cavity and the ambient pressure around the exterior of the valve. An indicator member is provided for detecting any leakage of the sealant past either the internal or external seals.

6 Claims, 6 Drawing Sheets

SEALING SYSTEM FOR A VALVE HAVING BIASSED SEALANT UNDER PRESSURE

BACKGROUND OF THE INVENTION

This invention relates to valves used in controlling the flow of fluids, and more particularly to sealing systems for sealing rotating or reciprocating elements in the valves such as valve stems.

It is desirable to prevent or to reduce to the extent possible the leakage of fluid from a valve inserted in a pipeline. This is particularly desirable in view of legislation restricting the emissions of volatile fluids into the atmosphere. With this increasing emphasis on environmental quality, leakage of gas, oil, or other toxic or hazardous fluid to the environment surrounding the valve is unacceptable. Valves having a rotating, reciprocating, sliding, or otherwise moving element, such as a valve stem, which penetrates the pressure boundary of the valve body, will subject the valve to the leakage of the fluid passing through the valve. Further, it is important to detect at the earliest possible time the leakage of the fluid around such a moving element.

Various types of valves have moving elements. One common valve is the quarter turn valve which includes a rotatable valve element that is rotated a quarter of a turn between the open and closed position for controlling fluid flow through the valve. Examples of quarter turn valves include plug valves, ball valves, and butterfly valves. Sometimes gate valves are referred to as multi-turn valves when the actuation element is a screw used to actuate the gate. A rotatable non-rising valve stem extends from the exterior of the valve into the valve body to connect with a valve member for rotating the valve member between its open and closed positions. A gate valve may also be a linear valve if the actuation of the gate is linear, i.e. a rising valve stem.

Typically, leakage through a valve is caused by the pressure differential between the pressure of the ambient environment around the valve and the pressure in the valve body cavity. Each time there is a rotation, reciprocation, or other movement of the stem within the valve body, this pressure differential tends to cause the lading, i.e. the fluids passing through the valve, to leak past the seals around the moving element. The lading may be oil, gas, chemicals or a toxic or hazardous fluid. There is potential of some minute leakage even in the stationary position of the moving element. Valves which have high cycle, i.e. the valve stems are rotated or reciprocated frequently, tend to be more susceptible to leakage around the valve stems. Although generally insignificant, molecular leakage may still occur by the lading passing through the valve by moving molecularly through the sealant by means of a type of osmosis. However, leakage by molecular migration is typically an insignificant portion of the overall leakage. Nevertheless, the reduction of any amount of leakage is important when the valve is handling a lading that is toxic or hazardous.

Valves with single seals around the moving element are eventually subject to leakage around their seals due to wear or failure of the seals between the valve body and the valve stem. In certain critical service applications, a bellows seal is provided to provide a complete hermetic seal around the valve stem. Such a system is expensive and requires a high operational cost particularly when a secondary seal containment system is required due to the regular failure rates of bellows type seals. This is particularly true of quarter turn valves and high cycle valves.

U.S. Pat. No. 5,129,625 discloses a live load packing system for sealing an operating valve member in a fluid valve. A lantern ring is placed around the valve stem and between two packing sets. The lantern ring communicates with the valve exterior to permit lubricating fluid to be inserted into the packing bore. A series of Bellville disk springs are disposed around the valve stem and bear on a guide sleeve for compressing the packing sets. Bolts are threaded into the valve bonnet to tighten a packing flange which causes the Bellville disk springs to be compressed and in turn compress the packing sets.

U.S. Pat. No. 5,170,657 discloses an apparatus and method for detecting fluid leakage into a space sealed by a fluid seal exposed to a pressurized fluid from a flow line or pressure vessel. The leaked fluid is communicated to a piston chamber in a fluid indicator device. Upon reaching a predetermined fluid pressure, the piston is actuated for extending an indicator rod for visual observation.

U.S. Pat. No. 4,972,867 discloses a valve stem leak detection apparatus which includes a leak detection tube 172 that extends through the valve jacket and communicates with a seal chamber. In the event of leakage past the primary seal, leakage is detected by a conventional fluid detector, such as a gas detector, which is connected to the seal chamber.

U.S. Pat. No. 4,197,531 discloses an alarm system for excessive leakage across the engaging faces of a mechanical seal on a rotating shaft. A barrier fluid from a reservoir is supplied by a filler pump to a seal cavity between double mechanical seals. The pump runs for a length of time necessary to bring the pressure of the liquid in the seal cavity to that of the shut off setting of a pressure switch on the pump. If leakage is excessive, the pump must operate with abnormal frequency and an alarm system is provided to sense this abnormal pump operation.

A need exists for a retrofittable seal structure which may be added to the valve to contain and sense leakage around the seal structure of the valve and prevent leakage of the lading to the environment surrounding the valve.

The present invention overcomes the deficiencies of the prior art.

SUMMARY OF THE INVENTION

The apparatus and method of the present invention is a sealing system for moving elements in a valve. The sealing system includes an internal seal between the valve body and moving element proximate the lading and an external seal between the valve body and moving element proximate the free end of the moving element. A space for sealant is formed around the moving element between the internal and external seals. A load member is provided for pressurizing the sealant within the space to a pressure greater than the fluid pressure of the lading in the valve body cavity and the ambient pressure around the exterior of the valve. An indicator member is also provided for detecting any leakage past either the internal or external seals.

By pressurizing the sealant between the internal and external seals, the space between the seals always maintains a pressure which is higher than the pressure within the valve cavity and the pressure of the ambient outside the valve. This higher pressure causes the sealant to tend to flow towards the ambient and towards the valve body cavity due to the pressure differential. This pressure differential inhibits the flow either from the body valve cavity to ambient if the valve body pressure is greater than the ambient pressure or from the ambient to the valve body cavity if the ambient pressure is greater than the valve body cavity pressure. If either the seal to the ambient or the seal to valve body cavity fails, the remaining seal will continue to hold pressure.

If there is leakage past one of the seals, the sealant in the sealant space will become depleted. Upon the depletion of the sealant to a predetermined amount, the indicator member will trip and provide a visual or electrical indication that there is leakage past one of the seals. Upon indication of the depletion of sealant, the sealant space may be recharged with sealant to determine if there is merely a slow leak past the seals or whether one of the seals has failed. Thus, the sealing system of the present invention provides not only an enhanced seal with the moving element in the valve but also provides an indication of leakage past the seals.

Other objects and advantages of the present invention will appear from the following description.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENTS

The sealing system of the present invention may be used with various types of valves having rotating, reciprocating, sliding, or otherwise moving elements. Although the sealing system has its greatest utility in high cycle valves, it is not restricted to high cycle valves and may be used with low cycle valves. Further, the sealing system is also highly effective in sealing moving elements in quarter turn valves such as plug valves, ball valves, or butterfly valves, but it should be appreciated that the sealing system of the present invention can also be used in rising and non-rising stem gate valves. Although the present invention is described for use in a quarter turn valve, such description is exemplary and not limiting.

Figure 1:
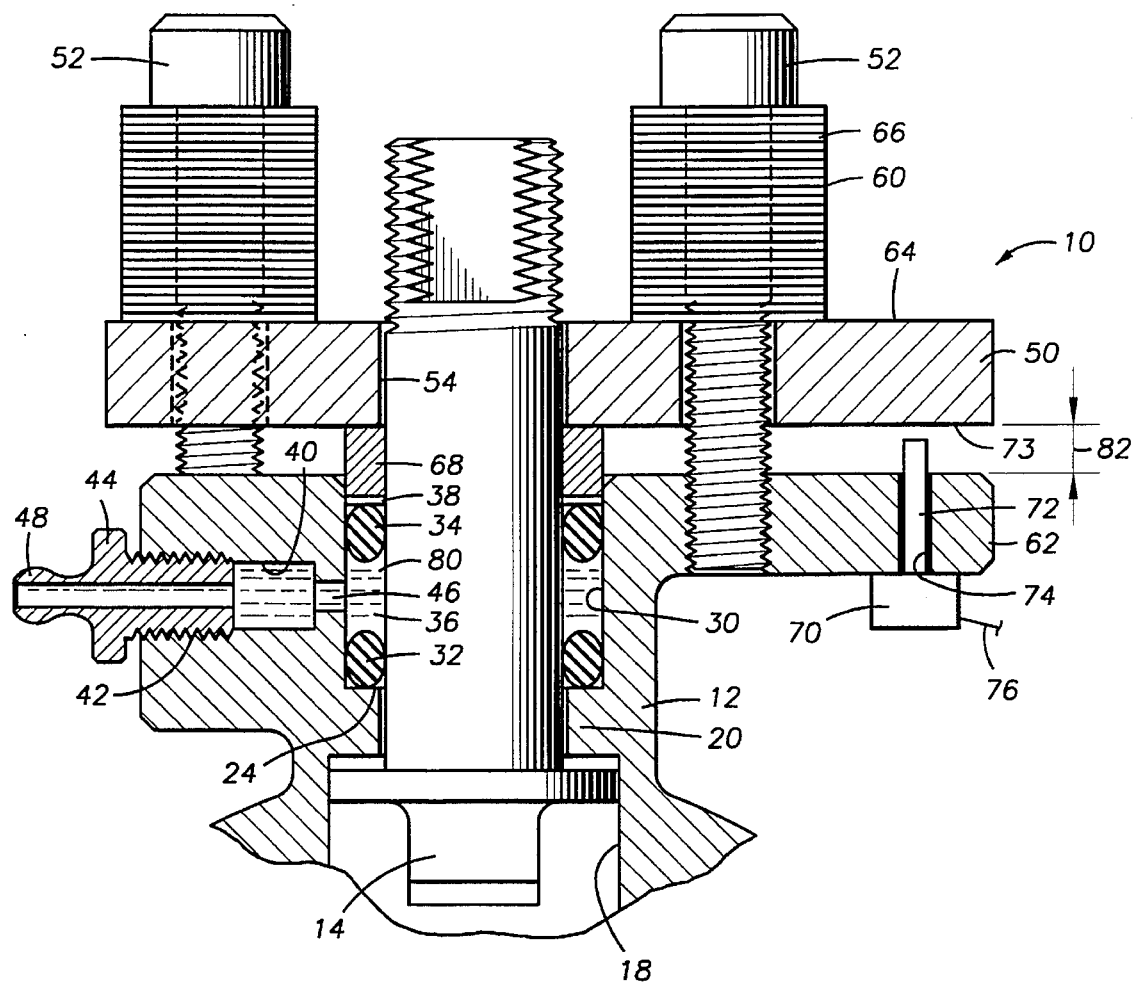
FIG. 1 is a side elevation view, partly in cross section, of a valve having an internal system for actuating and monitoring valve stem seals.

Referring initially to FIG. 1, there is illustrated a fluid valve 10 having a valve body (shown in FIGS. 3–6) with a valve bonnet 12 through which extends a valve stem 14. The fluid valve 10 may be one of various types of quarter turn valves including a ball valve, plug valve or butterfly valve. A stem 14 is disposed within a stem bore 18 of bonnet 12. The lower end of stem 14 is connected to the closure member of the valve such as a ball, plug, or butterfly. The upper end of stem 14 is adapted for attachment to an actuator (not shown) for valve 10. In this embodiment, the stem 14 rotates to align the closure member such as a ball (shown in FIGS. 3–6) housed within the flow way of the fluid valve 10. Stem bore 18 includes an upwardly facing annular shoulder 24 forming the annular base of a stuffing box or seal chamber 30 in bonnet 12. An internal sealing member 32 and an external sealing member 34 are disposed within seal chamber 30 and are radially compressed between the outer circumferential surface of the upper portion of stem 14 and the annular wall formed by chamber 30 in stem bore 18. Internal and external sealing members 32, 34 are separated to form a generally annular sealant cavity or space 36. A gland or follower ring 38 is disposed in the upper end of chamber 30 to engage and support external sealing member 34. Internal sealing member 32 engages outwardly facing annular shoulder 24.

Bonnet 12 also includes a blind bore 40 for the attachment, such as by threads 42, of a sealant fitting 44. A sealant port 46 is provided to communicate blind bore 40 with sealant space 36. As is typical with a sealant fitting, a passageway 48 is provided for the introduction of a working fluid or sealant 80 into blind bore 40 whereby the sealant 80 may be forced through sealant port 46 and into sealant space 36.

Various types of sealant may be used as the sealant 80 in the present invention. The selection of a particular sealant is highly dependent upon the lading passing through the fluid valve 10. It is desirable to use a sealant which has a very low absorption rate of the particular lading passing through the valve. Further, if the sealant has a high permeability to the lading, there will be a tendency for the lading to work its way through the sealant. If the sealant has a high permeability or high absorption with the lading, there is a tendency for the lading to pass through the sealant by means of molecular migration, a type of osmosis. Thus, it is preferred that a sealant be selected which has a fairly low permeability and absorption of the lading. Typically, a low fill type of grease is used having low entrained solids which reduces the absorption rate of the grease. Also, it is preferable that the sealant 80 provide some lubrication of the sealing members 32, 34 thereby extending the life of the sealing members 32, 34.

Although typically not the preferred sealant, a gas may also be used as the sealant 80 to pressurize the sealant space 36 between the sealing members 32, 34. A gas is preferred where the system is sensitive and requires a nondestructive and neutral working fluid or sealant. For example, most industrial systems can tolerate nitrogen and thus if one of the seals were to fail, the nitrogen, rather than another sealant such as grease, would be passed into the system.

A bonnet cap 50 is affixed to bonnet 12 by a plurality of threaded bolts 52. Cap 50 includes a central aperture 54 for receiving the upper actuator end of stem 14. A stack of a plurality of springs 60, such as Bellville disk springs, are disposed between the upper face 64 of cap 50 and the annular shoulder 64 formed between the cap and shaft of bolts 52. A spacer ring 68 is disposed between the lower face 73 of bonnet cap 50 and follower ring 38.

A position indicator 70 is attached to bonnet 12 such as on flange 62 and includes an indicator plunger or rod 72 extending in an aperture 74 in flange 62. Position indicator 70 includes an indicator 76, such as a flag or a microswitch producing an electrical signal, which is attached to indicator rod 72 whereby upon springs 66 forcing bonnet cap 50 toward bonnet 12, the face 73 engages and depresses indicator rod 72. The depression of indicator rod 72 will actuate indicator 76 to either release a flag or send a signal which indicates that the sealant 80 within sealant space 36 is below a predetermined level.

In operation, sealant 80 is injected through sealant fitting 44 to fill sealant space 36 to a predetermined pressure. Bolts 52 are tightened against spring stacks 66 to place a predetermined load on sealing members 32, 34 and sealant 80 as spacer ring 68 and follower ring 38 move downwardly into chamber 30 against external sealing member 34. The pressure of the sealant 80 within sealant space 36 is greater than the working pressure of the lading within the valve body cavity of fluid valve 10 and greater than the ambient pressure around fluid valve 10. The spring stacks 66 maintain this greater pressure within sealant space 36. Thus, a pressure differential is placed across each sealing member 32, 34 with the larger pressure being within sealant space 36. These pressure differentials tend to cause the sealant to flow toward the ambient and the valve body cavity and reverse the typical direction of leakage across the stem seals. In other words the sealant will tend to flow toward the valve body cavity rather than the lading tending to flow toward the ambient. Upon leakage of sealant 80 past either internal or external sealing member 32, 34, the spring stacks 66 will cause bonnet cap 50 to move downwardly toward bonnet 12. As the distance 82 between bonnet cap 50 and valve bonnet 12 becomes smaller and reaches a predetermined distance, bonnet cap face 73 engages indicator rod 72 so as to trip indicator 76. This indication informs the operator that there is leakage past one or both of the sealing members 32, 34.

The pressure on the sealant 80 within sealant space 36 need only be greater than the pressure of either the valve cavity or the ambient. This pressure is determined by the type of service of the valve. It is preferred that the pressure on the sealant 80 be approximately ten percent greater than the pressure of either the valve cavity or ambient. In a high pressure valve, the percent increase above the valve cavity pressure would be less than ten percent because a ten percent increase would significantly raise the pressure of the sealant 80 within the sealant space 36. Although typically the ambient pressure outside the valve is less than the pressure in the valve body cavity, in subsea environments, the ambient pressure may be significantly higher than the body valve cavity pressure.

By pressurizing the sealant 80 trapped between the internal and external sealing members 32, 34 on the stem 14, the sealant space 36 always maintains a pressure which is higher than the pressure within the valve cavity and the pressure of the ambient outside the valve. Thus, the seals are holding the sealant pressure within the sealant space 36 since this sealant space will have the higher pressure as compared to the body cavity pressure and ambient pressure. This higher pressure will cause the sealant to tend to flow towards the ambient and towards the valve body cavity. Thus, the pressure differential will favor the ambient and valve body cavity so as to inhibit and prevent flow either from the body valve cavity to ambient if the valve body pressure is greater than the ambient pressure or from the ambient to the valve body cavity if the ambient pressure is greater than the valve body cavity pressure. Further, if either the seal to the ambient or the seal to the valve body cavity fails, the remaining seal will continue to hold pressure. Thus, if one of the seals fails, and the sealant is blown out, the other seal will still hold pressure.

Figure 2:
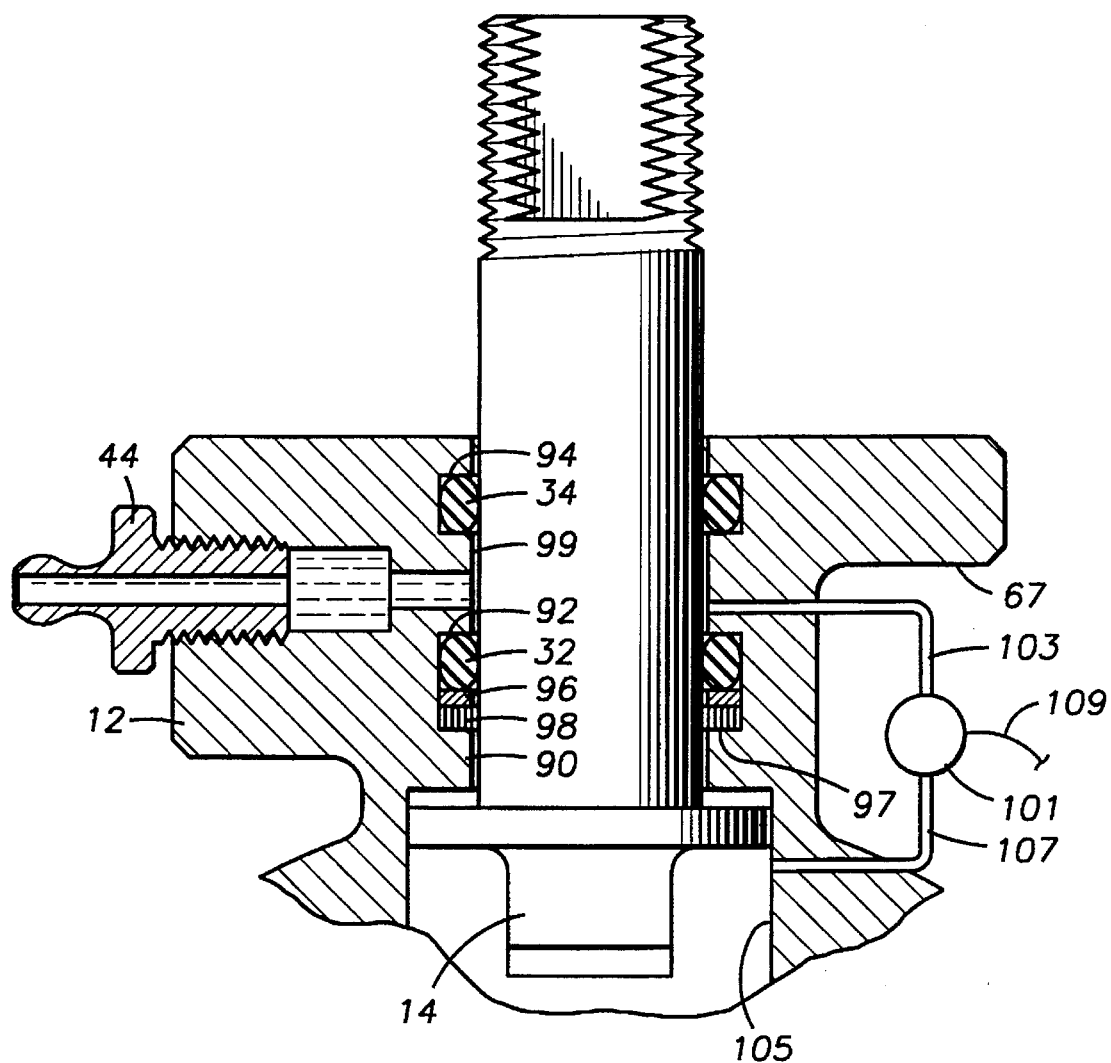
FIG. 2 is a side elevation view, partly in cross section, of an alternative embodiment of the internal system shown in FIG. 1.

Referring now to FIG. 2, there is shown an alternative embodiment of the present invention internal of the valve. As shown in FIG. 2, the valve bonnet 12 includes a stem bore 90 having an internal groove 92 and an external groove 94 for housing internal sealing member 32 and external sealing member 34, respectively. An annular sealant space 99 is provided between sealing members 32, 34 which communicates with sealant fitting 44 previously described with respect to FIG. 1. Internal sealing groove 92 is elongated to include a compression ring 96 for bearing on internal sealing member 32 and a biasing member 98, such as a wave spring, disposed between compression spring 96 and the lower radial wall 97 of groove 92.

In this embodiment, the wave spring 98 places a fixed spring load on internal sealing member 32. Further, the internal pressure of the valve body cavity at 105 also applies a load to internal sealing member 32. The combined spring load of biasing member 98 and pressure load of the valve body cavity combine to compress internal sealing member 32 to a pressure greater than the pressure of the valve body cavity 105. It should be appreciated that the internal and external sealing members 32, 34 and the compression ring 96 and biasing member 98 may be housed in annular grooves on stem 14 instead of in grooves in bonnet 12.

If an indicator member is desired, a means is provided for detecting the pressure differential between the pressure in the annular space 99 between internal and external sealing members 32, 34 and the pressure in the body cavity 105 of valve 10. As shown in FIG. 2, a passageway 103 extends from the annular space 99 between internal and external sealing members 32, 34 to a pressure indicator 101. Another fluid conduit 107 extends from the body cavity area 105 to pressure indicator 101. The pressure indicator 101 includes a means such as a pressure switch, well known in the art, for measuring the pressure difference between lines 103 and 107 to determine if there is leakage past sealing members 32, 34. Further, an indicator 109 may be attached to pressure indicator 101 to provide a visual or electrical signal to indicate that the pressure differential has dropped below a predetermined point.

The embodiments of FIGS. 1 and 2 are internal of the valve 10 in that means are provided within the valve housing for applying pressure to the sealant 80 and sealing members 32, 34. The embodiments of FIGS. 3-6 provide external means for pressurizing and monitoring the pressure on the sealant adjacent the sealing members around the stem of the valve.

Figure 3:
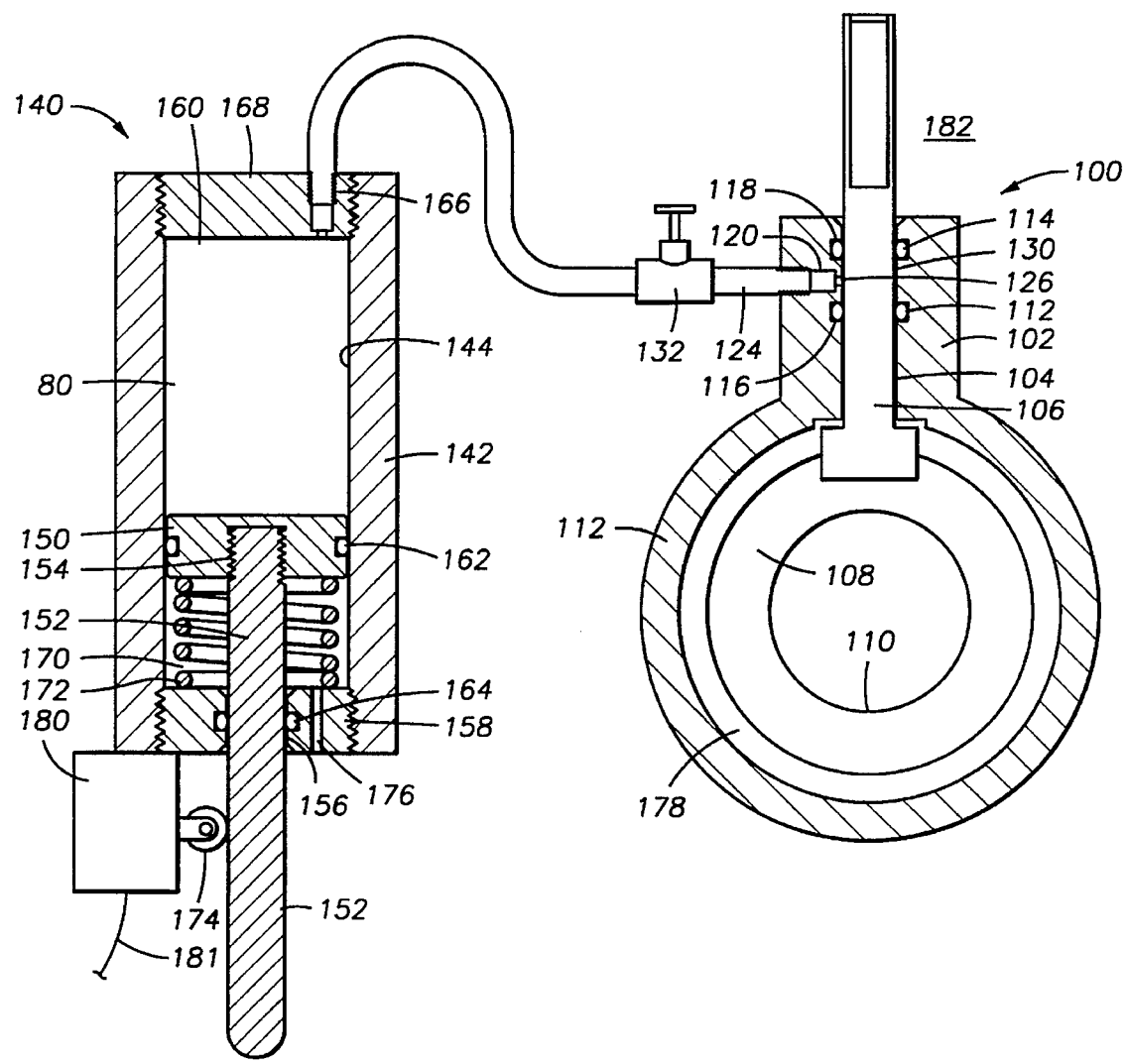
FIG. 3 is a diagrammatic view, partly in cross section, of an external system for actuating and monitoring valve stem seals.

Referring now to FIG. 3 there is shown a fluid valve 100 having a bonnet 102 with a stem bore 104 for receiving a valve stem 106. Valve stem 106, in this embodiment, is shown attached to a ball 108 which includes a flow aperture 110 for alignment with the flowbore of the valve body 112.

The stem bore 104 includes an internal groove 112 and an external groove 114 for receiving an internal sealing member 116 and an external sealing member 118, respectively. A blind bore 120 is provided in the wall of bonnet 102 and is attached to a sealant conduit 124. Blind bore 120 includes a sealant port 126 which extends from blind bore 120 to an annular sealing space 130 around stem 106 between upper and lower sealing members 116, 118.

An external pressurizing and monitoring means 140 communicates with annular sealing space 130 by means of pressure conduit 124. Pressure conduit 124 may include a valve 132 for opening and closing conduit 124. The pressurizing and monitoring means 140 includes an enclosure 142 forming an internal chamber 144. Enclosure 142 may be in the form of a cylinder within which is received a piston 150. Piston 150 includes an indicator rod 152 attached at 154 and projecting through an aperture 156 in a closure member 158 at one end of enclosure 142. Piston 150 divides chamber 144 into a reservoir 160 for sealant 80 and a load chamber 170 housing a coil spring 172. Spring 172 is compressed between the inwardly directed faces of piston 150 and closure member 158. Closure member 158 includes a relief port 176 which extends between ambient and load chamber 170 to prevent any pressure lock of piston 150. A sealing member 162 is mounted within an annular groove around piston 150 for sealingly engaging the inner cylindrical wall of enclosure 142 for dividing chamber 144. A sealing member 164 is disposed in an annular groove in aperture 156 of closure member 158 for sealingly engaging the indicator rod 152. The other end of pressure conduit 124 is connected to bore 166 extending through upper closure member 168 of enclosure 142. A position indicator 180 is attached to enclosure 142 and includes a microswitch member 174 having one position where it engages indicator rod 152 and another position where it no longer engages indicator rod 152.

In operation, reservoir 160 is filled with sealant 80. Spring 172 is compressed placing a spring load on piston 150 sufficient to place a load on and pressurize sealant 80 through sealant conduit 124 and annular sealing space 130 such that the pressure on the sealant 80 in sealant space 130 is greater than the pressure within valve body cavity 178 and the pressure at ambient 182. Indicator rod 152 is in the fully extended position thereby depressing indicator switch 174. As sealant 80 slowly leaks past either internal sealing member 116 or external sealing member 118, reservoir 160 is depleted of sealant 80. At a point well before reservoir 160 is fully depleted, indicator rod 172 clears indicator switch 174 thereby allowing indicator switch 174 to move to its non-engaged position thereby tripping indicator 180. Indicator 180 then provides a positive indication that there has been leakage past sealing members 116, 118 and service is required.

Since the pressurized reservoir 160 provides sealant 80 to the sealant space 130, if there is leakage past one of the sealing members 116, 118, the reservoir 160 will lose sealant 80 and eventually be depleted of sealant. Indicator 180 will trip upon the reservoir 160 being depleted a predetermined amount. The indicator may include a mechanical visual flag or an electrical signal 181 which is sent to a remote sensing device such as in an industrial installation. In an industrial installation, a remote sensing device is preferred since all valves can then be monitored from a central location.

An indication that the reservoir 160 has been depleted of sealant 80 a predetermined amount, does not mean that the sealing members 116, 118 have failed or will soon fail. It is an indication that the seals should be checked and the system recharged with additional sealant. If there is a failure of a sealing member 116, 118 either to ambient 182 or to the valve cavity 178, the other sealing member 116, 118 will provide a backup seal with the stem 106. Thus, the indicator 180 will provide notice before actual seal failure. The indicator 180 is set to trip well before the reservoir 160 is fully depleted of sealant 80. This provides a margin of safety so that an indication of leakage is known prior to a complete failure of the seals. Upon receiving an indication that the sealant 80 has been depleted in the reservoir 160, the reservoir 160 is recharged with sealant 80. If the reservoir 160 continues to be depleted of sealant 80 quickly, the operator knows that one of the sealing members 116, 118 has failed. If the reservoir 160 is recharged with sealant 80 and holds pressure, then the operator knows that there is merely a slow leakage across the sealing members 116, 118 and it is not necessary to shut the valve 100 down and perform immediate maintenance. If, however, there has been a complete failure of one of the sealing members 116, 118, the valve 100 can be shut down and the sealing members 116, 118 replaced. If the leakage is due to general wear of the sealing members 116, 118, the sealing members 116, 118 can be maintained and later replaced during routine maintenance. A quick depletion of the reservoir 160 may only indicate that one of the sealing members 116, 118 has failed and that the sealant 80 is passing from the sealant space 130 either to ambient 182 or to the valve body cavity 178 while the remaining sealing members 116, 118 continues to hold pressure. This allows the remaining sealing members 116, 118 to be a backup seal until maintenance may be performed.

Figure 4:
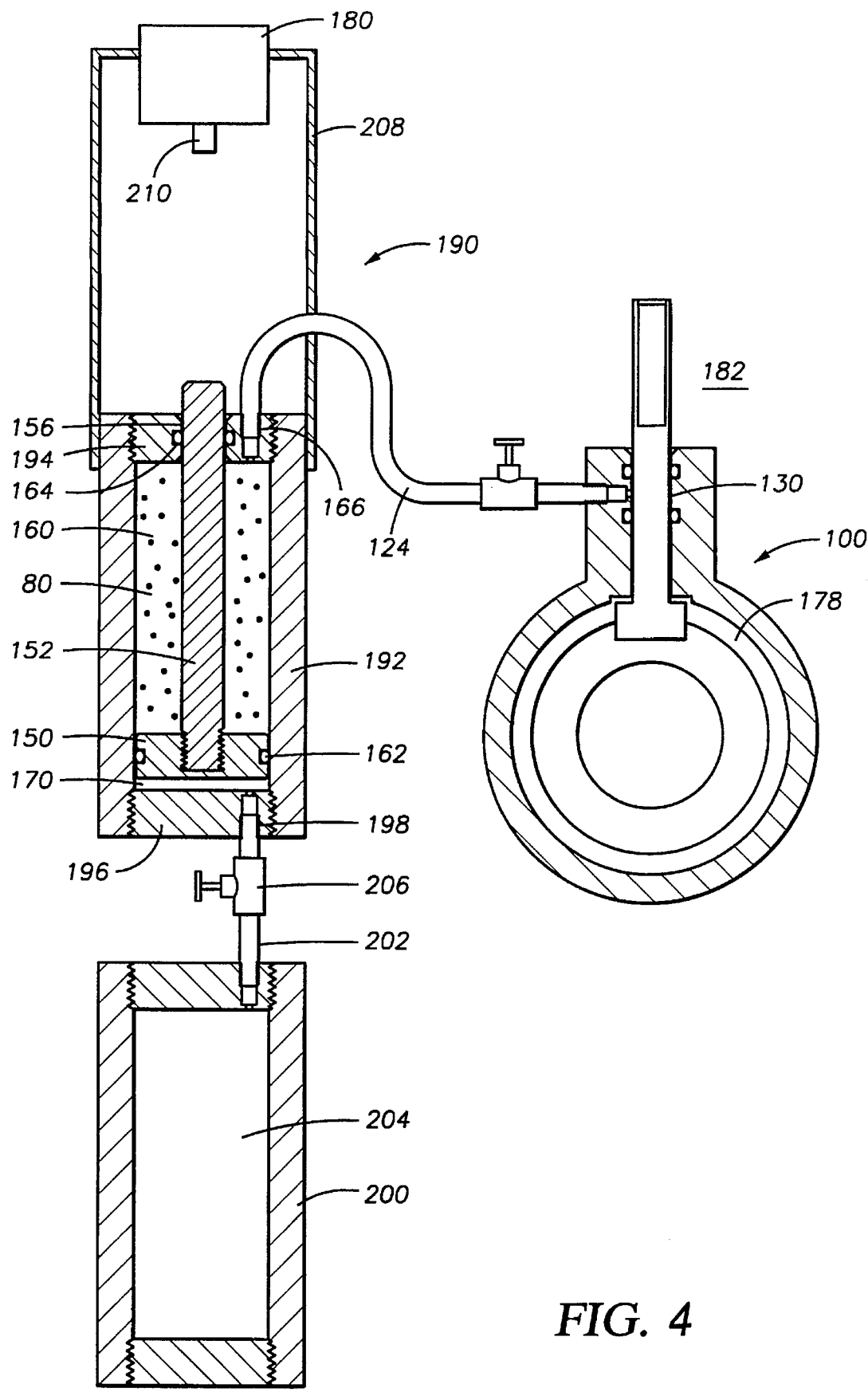
FIG. 4 is a diagrammatic view, partly in cross section, of an alternative external system to that of the external system shown in FIG. 3.

Referring now to FIG. 4, there is shown an alternative to the embodiment of FIG. 3. Valve 100 is the same and therefore a description of valve 100 will not be repeated. With respect to the pressurizing and monitoring means 190, the enclosure 192 is substantially the same as enclosure 142 with the reversal of certain parts. The indicator rod 152 projects through the reservoir 160 rather than through the load chamber as shown in FIG. 3. Further, the closure member 194 having aperture 156 does not include a relief port 176 but does include bore 166 for connection to sealant pressure conduit 124. The other closure member 196 includes a bore 198 for connection to a conduit 202 communicating with a pressurized enclosure 200 having a fluid which has been pressurized within an interior chamber 204. A valve 206 is provided in conduit 202 to regulate the pressure from pressurized chamber 204. Position indicator 180 is mounted on the other end of the enclosure 192 by a support 208. Position indicator 180 includes a plunger rod 210 aligned to engage the terminal end of indicator rod 52.

In operation, the reservoir 160 is filled with sealant 80 and load chamber 170 is pressurized by means of opening conduit 202 to pressurized chamber 204. The piston 150 places a load on the sealant such that the sealant at sealing space 130 has a pressure greater than the pressure within the valve body cavity 178 and ambient pressure 182. As the sealant in reservoir 160 is depleted, the terminal end of indicator rod 152 will engage plunger 210 thereby actuating position indicator 180.

Figure 5:
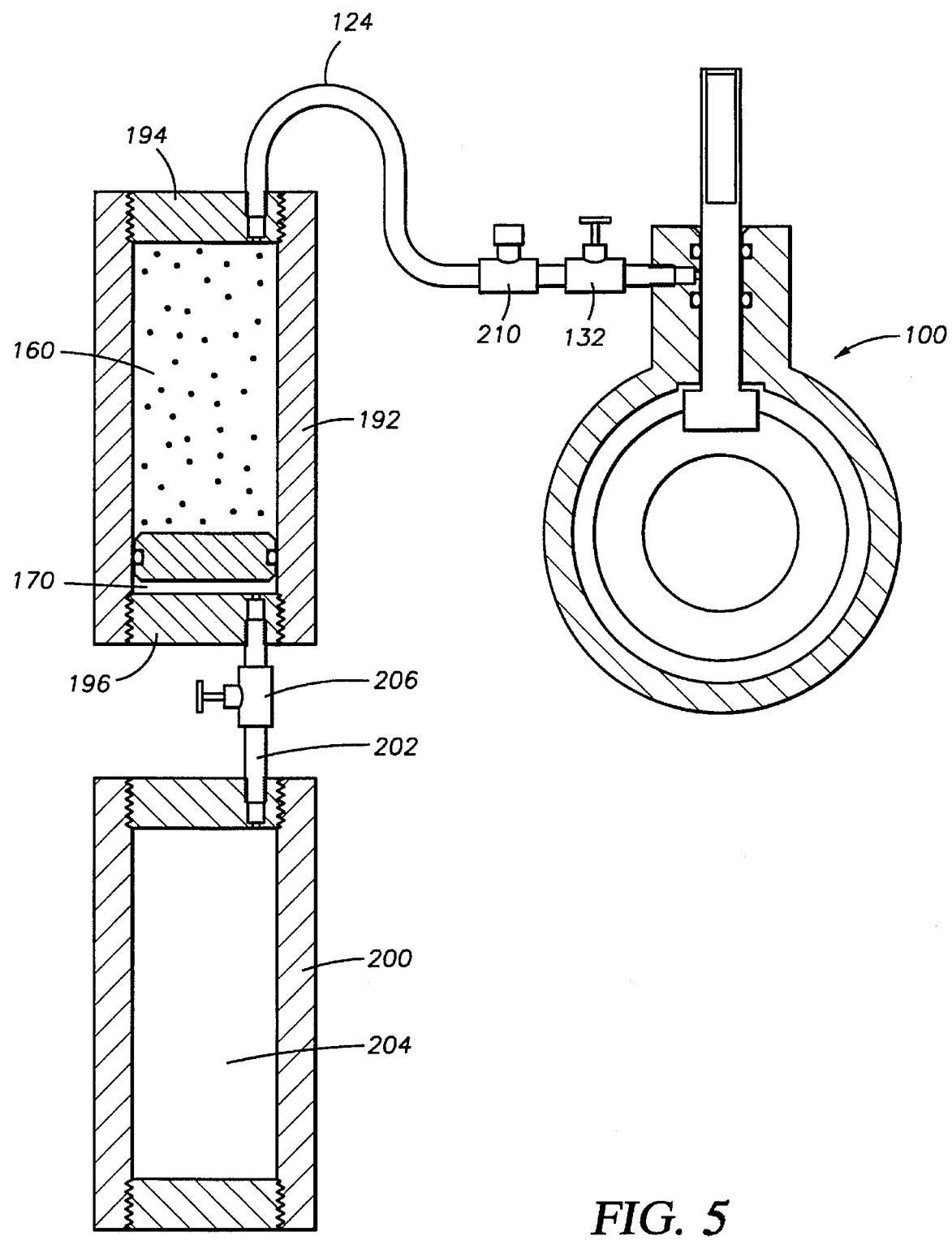
FIG. 5 is a diagrammatic view, partly in cross section, of another alternative external system for actuating and detecting leakage past valve stem seals.

Referring now to FIG. 5, there is shown an alternative to the embodiment shown in FIG. 4. In this embodiment there is provided a different indicator means 210. The position indicator 180 and indicator rod 152 are replaced by position indicator 210. Position indicator 210 monitors the pressure in sealant pressure conduit 124. If the pressure in conduit 124 falls below a predetermined pressure, such as five percent above the pressure of the valve body cavity, there is provided an indication of the depletion of the sealant 80 in reservoir 160.

Figure 6:
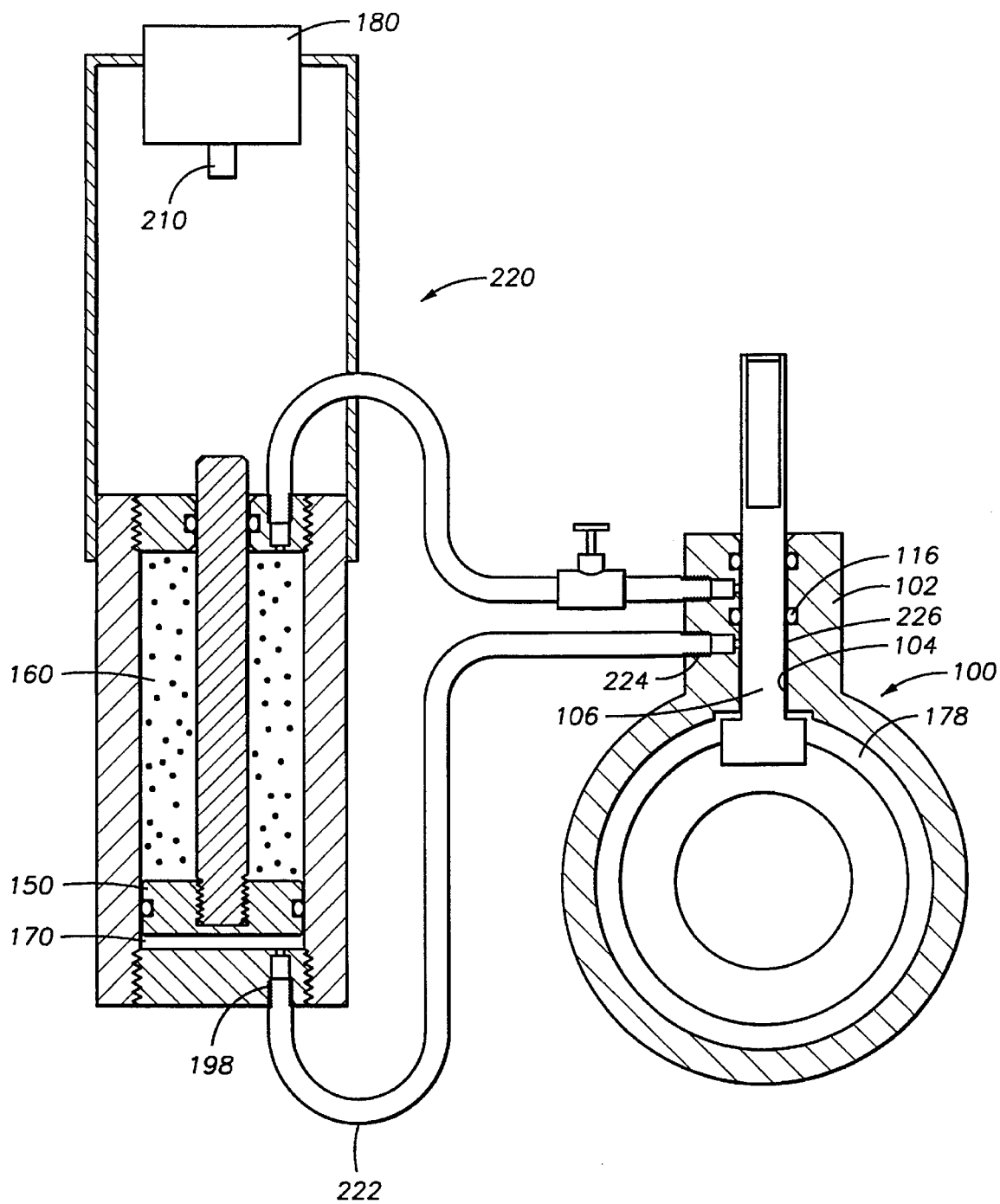
FIG. 6 is a diagrammatic view, partly in cross section, of a still another alternative external system for actuating and detecting leakage past valve stem seals.

Referring now to FIG. 6, there is shown an alternative to the embodiment shown in FIG. 4 where the pressure of the valve body cavity 178 provides the pressure for load chamber 170. The pressurizing and monitoring means 220 is similar to that of 190 in FIG. 4 with the exception that the pressure enclosure 200 of FIG. 4 is replaced with a pressure line 222 which is connected at one end to bore 198 and to bore 224 in bonnet 102 at its other end. Bore 224 extends to the annular area 226 below sealing member 116 and between stem bore 104 and stem 106. The pressure from body cavity 178 communicates through annular area 226 and thus with load chamber 170 by means of conduit 222. The apparatus and method of FIG. 6 then operates similarly to that of FIG. 4 with the exception that the valve body cavity pressure 178 is provided within load chamber 170 to act on piston 150.

While a preferred embodiment of the invention has been shown and described, modifications thereof can be made by one skilled in the art without departing from the spirit of the invention.

I claim:

1. An apparatus for sealing a moving element in a valve body having a fluid under pressure flowing through a cavity in the valve body comprising:

an internal seal between the valve body and moving element proximate the fluid under pressure;

an external seal between the valve body and moving element proximate the free end of the moving element;

a space around the moving element for sealant between said internal and external seals;

a biasing member for biasing one of said internal and external seals towards the other of said internal and external seals to pressurize the sealant to a pressure greater than the fluid pressure and ambient pressure causing the sealant to tend to flow towards the valve body cavity and towards the ambient.

2. The apparatus of claim 1 further including an indicator member for detecting a leakage of the sealant from said space.

3. The apparatus of claim 2 wherein said indicator member includes a visual indicator.

4. The apparatus of claim 2 wherein said indicator member produces an electrical signal indicating a pressure of the sealant.

5. The apparatus of claim 1 further including a reservoir for the sealant and means for communicating the reservoir with said space.

6. The apparatus of claim 1 wherein said internal and external seals are O-rings sealingly engaging the valve body and the moving element.

* * * * *